United States Patent
Pfannschmidt et al.

(10) Patent No.: US 7,411,323 B2
(45) Date of Patent: Aug. 12, 2008

(54) ELECTRICAL MACHINE HAVING COOLED LAMINATED STATOR AND ROTOR CORES AND WINDINGS

(75) Inventors: Bernd Pfannschmidt, Rosstal (DE); Ekkehard Pittius, Roth (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/553,698

(22) PCT Filed: Apr. 1, 2004

(86) PCT No.: PCT/EP2004/003475

§ 371 (c)(1),
(2), (4) Date: Aug. 3, 2006

(87) PCT Pub. No.: WO2004/093292

PCT Pub. Date: Oct. 28, 2004

(65) Prior Publication Data

US 2007/0024129 A1     Feb. 1, 2007

(30) Foreign Application Priority Data

Apr. 16, 2003   (DE) ................................ 103 17 593

(51) Int. Cl.
*H02K 9/06*       (2006.01)
*H02K 9/16*       (2006.01)
*H02K 9/22*       (2006.01)
(52) U.S. Cl. .................. 310/58; 310/60 A; 310/61
(58) Field of Classification Search .................. 310/52, 310/58–60 A, 61
See application file for complete search history.

(56) References Cited

U.S. PATENT DOCUMENTS

| | | | |
|---|---|---|---|
| 1,196,345 A | | 8/1916 | Field |
| 2,610,992 A | | 9/1952 | Johns et al. |
| 3,241,331 A | * | 3/1966 | Endress et al. ................. 62/117 |
| 3,571,634 A | * | 3/1971 | Sato et al. ...................... 310/54 |
| 4,286,182 A | * | 8/1981 | Lenz ............................. 310/61 |
| 4,322,646 A | * | 3/1982 | Persson ......................... 310/64 |
| 4,352,034 A | * | 9/1982 | Karhan et al. .................. 310/59 |
| 4,398,108 A | * | 8/1983 | Danilevich et al. ............. 310/54 |
| 4,498,024 A | * | 2/1985 | Moretti et al. ................. 310/59 |
| 5,122,704 A | * | 6/1992 | Blakeley et al. ............... 310/54 |

(Continued)

FOREIGN PATENT DOCUMENTS

DE      528 381      6/1931

(Continued)

*Primary Examiner*—Tran Nguyen
(74) *Attorney, Agent, or Firm*—Henry M. Feiereisen; Ursula B. Day

(57) ABSTRACT

High-power electric machines must be intensively cooled. At the same time, it is necessary to ensure a high level of immunity to impurities. For this purpose, the rotor and stator sheet packs (41, 42, 61, 62) are embodied in two parts, thereby making it possible to carry out a two-sided ventilation, said parts being maintained separately in the middle by a ring (5, 7). Said ring (5, 7) is provided with ribs (51, 52, 71, 72) in such a way that radial flow channels are formed between partial sheet stacks and ensure corresponding flow rate. In another embodiment, monoblock sheet stacks are provided with cooling channel extensions on either side of the sheet stack. Said cooling extensions alternate on the axial cooling channels in the peripheral direction and transport heated coolant outwards in respectively opposite directions.

7 Claims, 2 Drawing Sheets

U.S. PATENT DOCUMENTS

| | | | |
|---|---|---|---|
| 5,365,132 A * | 11/1994 | Hann et al. | 310/58 |
| 5,889,342 A * | 3/1999 | Hasebe et al. | 310/54 |
| 6,097,116 A * | 8/2000 | Hess et al. | 310/61 |
| 6,359,350 B1 | 3/2002 | Kaiho et al. | |
| 6,903,471 B2 * | 6/2005 | Arimitsu et al. | 310/59 |
| 6,954,010 B2 * | 10/2005 | Rippel et al. | 310/60 A |
| 2002/0005671 A1 * | 1/2002 | Welke et al. | 310/52 |
| 2002/0185923 A1 * | 12/2002 | Mori et al. | 310/61 |
| 2003/0030333 A1 * | 2/2003 | Johnsen | 310/54 |
| 2003/0075996 A1 * | 4/2003 | Yoshida et al. | 310/58 |
| 2003/0160527 A1 * | 8/2003 | Kimberlin et al. | 310/87 |

FOREIGN PATENT DOCUMENTS

| | | |
|---|---|---|
| DE | 680 039 | 8/1939 |
| DE | 24 23 853 | 11/1975 |
| DE | 39 25 337 | 2/1991 |
| DE | 43 20 559 | 12/1994 |
| DE | 44 13 389 | 12/1994 |
| DE | 195 14 592 | 10/1996 |
| DE | 197 42 255 | 11/1998 |
| DE | 100 18 642 | 11/2000 |
| DE | 100 54 338 | 7/2002 |
| EP | 0 118 802 | 9/1984 |
| EP | 0 387 743 | 9/1990 |
| EP | 522 210 | 1/1993 |
| EP | 581966 A1 * | 2/1994 |
| EP | 0 739 076 | 6/1999 |
| EP | 1 204 193 | 5/2002 |
| FR | 2 349 228 | 11/1977 |
| GB | 230 137 | 3/1925 |
| JP | 56 125941 | 10/1981 |
| JP | 57049344 A * | 3/1982 |
| JP | 61 218333 | 9/1986 |
| JP | 2000 278914 | 10/2000 |
| JP | 2002186221 A * | 6/2002 |

* cited by examiner

ELECTRICAL MACHINE HAVING COOLED LAMINATED STATOR AND ROTOR CORES AND WINDINGS

BACKGROUND OF THE INVENTION

The present invention relates to an electrical machine having two laminated rotor cores, which are arranged on a common shaft at a predetermined axial distance and each have axially extending cooling channels, and two laminated stator cores, which are associated with the laminated rotor cores. Furthermore, the present invention relates to an electrical machine having a housing, a laminated stator core and a laminated rotor core, which are arranged in the housing and of which at least one has axially extending cooling channels, and end winding areas at the end sides of the two laminated cores. In addition, the present invention relates to a corresponding method for cooling an electrical machine by passing an axial flow of a coolant through at least one cooling channel of a laminated rotor core and/or laminated stator core.

Electric motors, in particular asynchronous motors, are generally cooled by separate ventilation or self-ventilation. In the case of standardized, low-power motors, it is generally sufficient for there to be surface cooling. Low-power and medium-power traction machines require a higher level of cooling in the stator and rotor. For this purpose, axially extending cooling channels in the stator and rotor are provided with a coolant on one side. In the case of medium-power and high-power industrial machines, axial cooling channels are likewise provided in the rotor. The cooling channels are supplied with cooling air on one or both sides, and the cooling air emerges through radial cooling channels between two or more laminated core elements. In order not to allow the length of the laminated core to not become too great, the air gaps between the laminated core elements are only a few millimeters wide.

One problem when cooling with ambient air consists in the fact that the air can become contaminated with particles. However, in the case of a high content of dirt in the cooling air, narrow cooling slots would form relatively quickly and impair the cooling effect. In order to prevent this, a heat exchanger is usually provided in industrial machines. This ensures that only clean air circulates in the interior of the machine. In the case of traction machines, on the other hand, there is no installation space available for a heat exchanger owing to the narrow spatial conditions. In addition, this heat exchanger increases the temperature of the internal cooling air, which in turn limits the performance.

If the heat exchanger cannot be used, the cooling air needs to be filtered for the narrow cooling slots by means of a fine-pored air filter. In the case of a large deposit of dirt, this means changing the filter mat very frequently, which is undesirable and is not practicable, for example, in the case of dumper trucks in mining.

A generic electrical machine is known, for example, from the document U.S. Pat. No. 2,610,992. The laminated stator and rotor cores described therein have axially extending air cooling channels.

The German laid-open specification DE 44 13 389 also describes an electrical machine, which has two laminated rotor cores arranged on a common shaft at an axial distance from one another, two laminated stator cores arranged at a corresponding distance from one another and a cooling device, which has an air conveying device and cooling channels extending in the axial direction. Said cooling channels are each divided into two sections, as a result of the axial distance between the laminated cores, and are connected to the air conveying device such that a flow is passed through the two sections of each cooling channel in opposite directions. In the annular space between the laminated cores, the cooling air is deflected out of an axial direction into a radial direction, or vice versa. The axial distance between the laminated cores is in this case selected such that the flow cross section available for the cooling air in the annular space between the laminated cores is approximately equal to the sum of the flow cross sections of all of the cooling channels opening out directly into this annular space.

SUMMARY OF THE INVENTION

The object of the present invention consists in ensuring a high degree of insensitivity to dirt during intensive cooling of an electrical machine.

According to the invention, this object is achieved by an electrical machine having two laminated rotor cores, which are arranged on a common shaft at a predetermined axial distance and each have axially extending cooling channels, and two laminated stator cores, which are associated with the laminated rotor cores, the laminated stator cores likewise having axially extending cooling channels, and in each case one ring being arranged between the laminated rotor cores and the laminated stator cores, each ring having radially extending flow channels, which are connected to the cooling channels of the respective laminated core.

The ring ensures that the coolant flow emerges radially in the center of the rotor or stator at an increased flow speed. It is thus possible to reduce the risk of dirt particles being deposited in the flow channels. This cooling design makes it possible to dispense with small gaps and holes, which could quickly become blocked owing to soiling. Furthermore, this cooling design makes cooling possible on both sides. This means that cold cooling air can be blown onto both sides of the machine. As a result, nonuniform cooling of the stator or rotor can be prevented. Nonuniform cooling in the case of air being supplied on one side is shown in temperature differences between the two end sides of the laminated core.

The ring(s) between the laminated rotor and/or stator cores may have radially extending webs. In the laminated rotor core, such a ring then has the effect of a blade wheel, which conveys the cooling air to the outside when it rotates.

The two laminated rotor cores and the two laminated stator cores are in each case preferably pressed against one another. The rings between the respective laminated cores, possibly with the webs, prevent laminates of the laminated core being bent in the radial cooling channel between the two laminated cores owing to the compression forces during pressing or magnetic attraction.

At least one of the laminated cores can be chamfered at the point at which the coolant flow is deflected out of its axial direction of flow into the radial direction of flow. This reduces the flow resistance and means that a higher flow speed can be maintained.

Furthermore, the invention provides an electrical machine having a housing, a laminated stator core and a laminated rotor core, which are arranged in the housing and of which at least one has axially extending cooling channels, and end winding areas at the end sides of the two laminated cores, a cooling channel protrusion being arranged at at least one of the cooling channels in one of the end winding areas, it being possible with said cooling channel protrusion to deflect a coolant out of the housing.

Here too, the high cooling power and low sensitivity to dirt are achieved owing to the cooling on both sides and the avoidance of small gaps and holes. The cooling air is blown axially and/or radially into the motor housing on both end sides (drive side and non-drive side), and, after flowing over the stator end windings or rotor short-circuiting rings, enters the axial stator and rotor cooling holes. In this case, the diameters of the cooling holes and the air speed are also selected to be so large that no dirt can be deposited. The air outlet is separated from the air inlet by means of corresponding channels, i.e. cooling channel protrusions.

Tubes in the form of cooling channel protrusions on the laminated stator core are preferably guided through the mounting plate of the electrical machine. The exhaust air can thus be guided to the outside through the end winding area, into which the coolant is introduced.

The cooling channel protrusions on the laminated rotor core are preferably parts of the rotor clamping ring or are incorporated into this ring. The coolant to be guided away can thus be transported through the end winding area up to the mounting plate and, from there, pass to the outside through cutouts in the mounting plate. For this purpose, seals should be provided between the mounting plate and the rotor clamping ring, such that the coolant to be guided away does not flow into the end winding area or into the mount.

Two or more cooling channels are advantageously distributed in the circumferential direction in the laminated stator core and/or laminated rotor core, and every second cooling channel has the cooling channel protrusion at one end side of the respective laminated core, and the other cooling channels have their cooling channel protrusions at the other end sides of the respective laminated core. A flow thus passes through the laminated cores in the circumferential direction, alternately in both axial directions.

BRIEF DESCRIPTION OF THE DRAWING

The present invention will now be explained in more detail with reference to the attached drawings, in which.

DETAILED DESCRIPTION OF PREFERRED EMBODIMENTS

Figure 1:
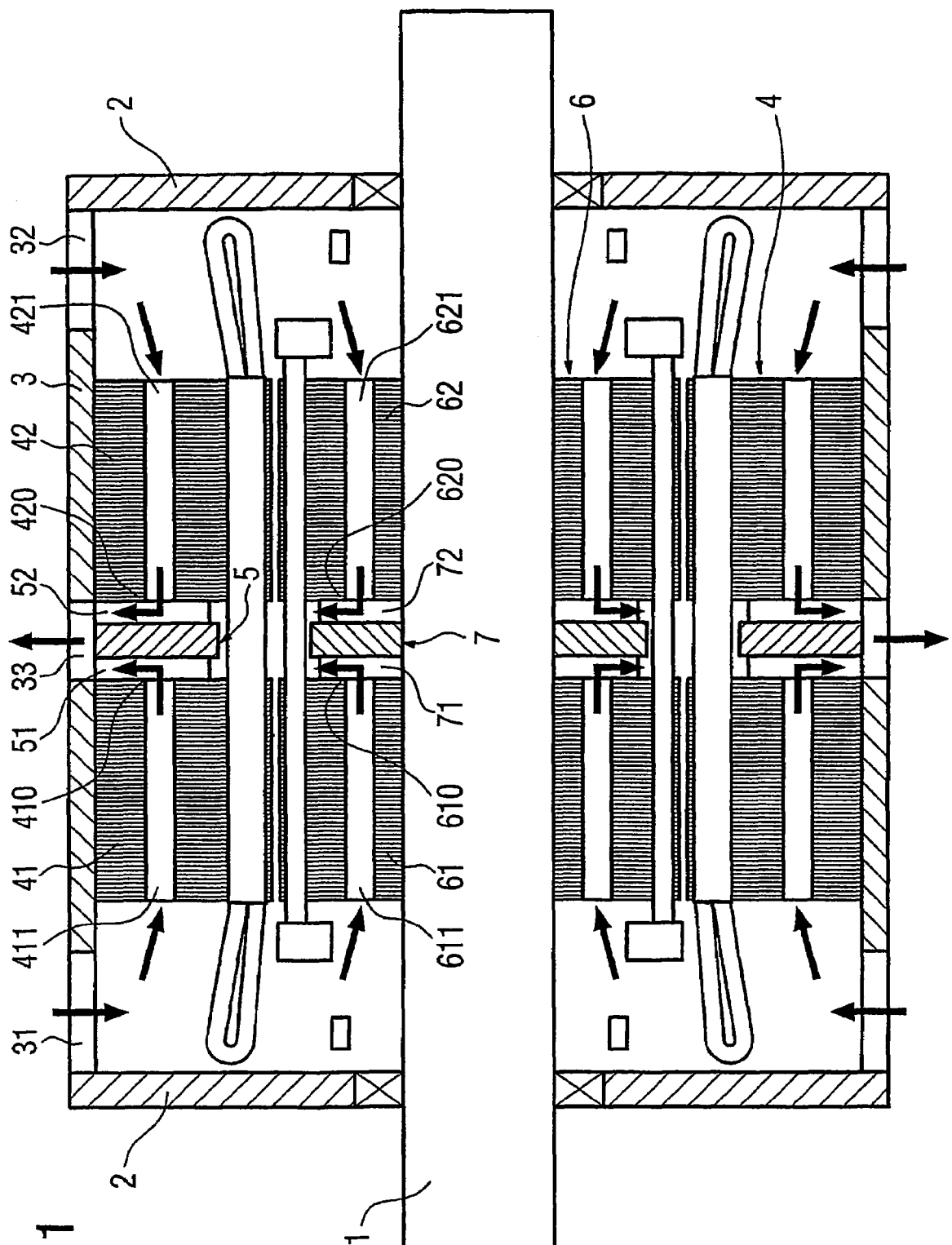
FIG. 1 shows a cross-sectional view of an asynchronous motor in accordance with a first embodiment of the present invention.

The following exemplary embodiments represent preferred embodiments of the present invention. The asynchronous machine illustrated in FIG. 1 has a shaft 1, which is mounted in mounting plates 2. A housing section 3, which extends in the circumferential direction, completes the housing of the electrical machine.

The stator 4 of the asynchronous machine has two laminated core elements 41 and 42, which are pressed against one another. Located between them is a ring 5 having radially extending webs 51, 52 on both sides.

The rotor 6, which has been attached to the shaft 1 by shrink-fitting, has a similar design. It also has two laminated rotor cores 61 and 62 and a ring 7, lying therebetween, having radially extending webs 71 and 72 on both sides.

The coolant flows on both sides of the laminated stator core through cutouts 31 and 32 into the respective end winding area. From there, it flows through cooling channels 411 and 421 of the stator 4 to the gap between the laminated stator cores 41, 42, in which the ring 5 is located. The webs 51 and 52 provide corresponding flow channels in the radial direction to the outside. The coolant flows out of the housing of the asynchronous machine through a cutout 33.

Some of the coolant flowing into the cutouts 31, 32 flows past the end windings and short-circuiting rings into cooling channels 611 and 621 of the laminated rotor cores 61, 62. Here, too, the coolant flows, extending axially inwards, are deflected radially to the outside in the center by the ring 7 or its webs 71, 72.

The rings 5 and 7 thus have the dual function of supporting the air guidance and stabilizing the laminated core. The webs 71, 72, which guide radially to the outside, convey the air to the outside owing to the rotary movement of the rotor. If the asynchronous machine is only designed to have one direction of rotation, the webs 71, 72, possibly also the webs 51, 52, can be correspondingly curved in the circumferential direction in order to reduce interference noise.

In order to reduce the flow resistance, the edges 410, 420, 610, 620 can be chamfered or rounded off (not illustrated in the drawing). This makes it possible to increase the radial flow speed after deflection.

In order to protect against abrasion, those parts of the stator coils which are located in the gap are surrounded by a protective sleeve (likewise not illustrated).

Figure 2:
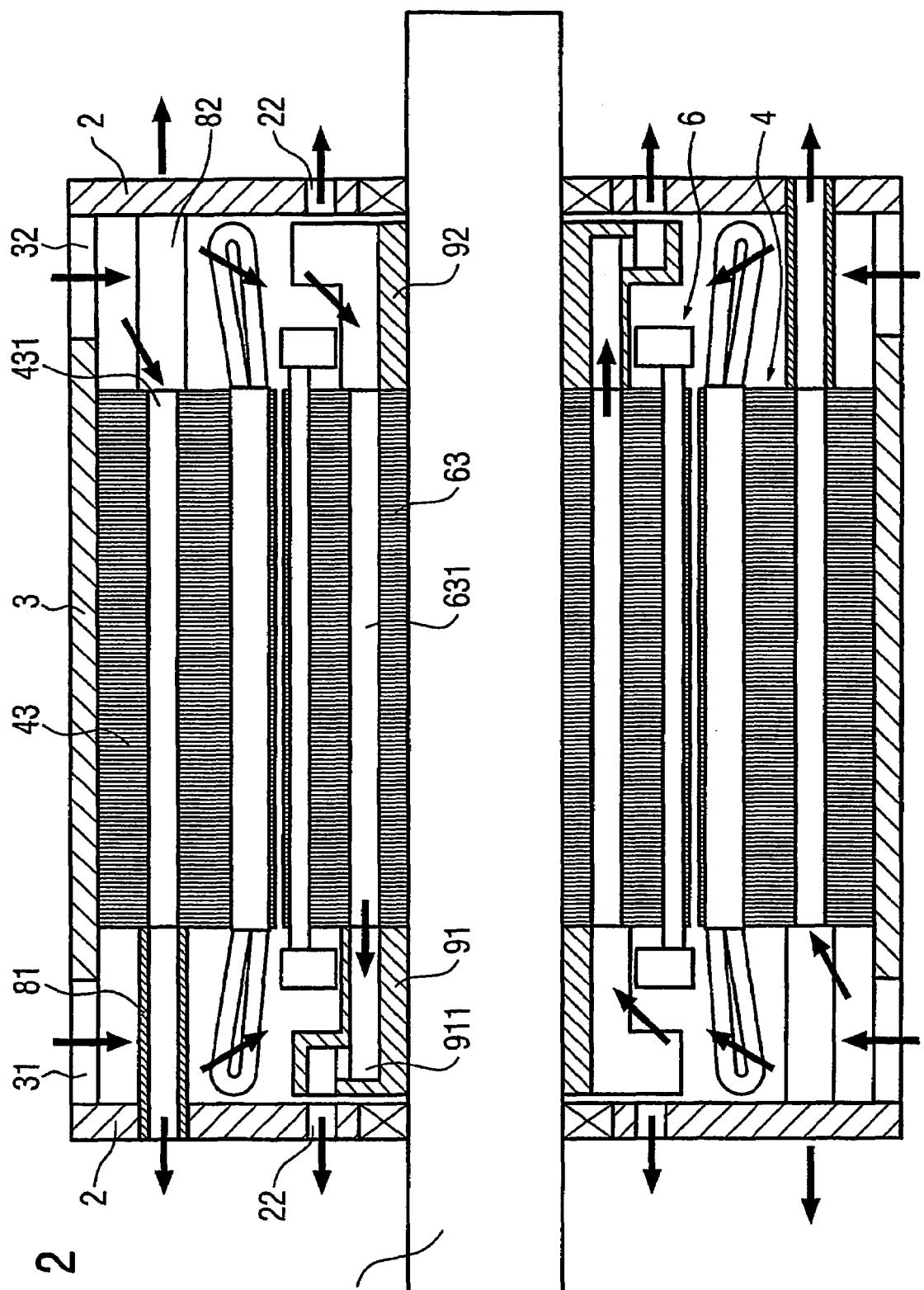
FIG. 2 shows a cross section through an asynchronous motor in accordance with a second embodiment of the present invention.

The second embodiment of the present invention is illustrated in FIG. 2. The components, which correspond to those in the first embodiment, are identified by the same references. In this regard, reference is made to the description relating to FIG. 1.

The integral laminated stator core 43 is provided with an axially extending cooling channel 431. In the left-hand end winding area (as seen in the illustration), the cooling channel 431 continues to be passed through a tube 81 as the cooling channel protrusion. The tube 81 passes through the mounting plate 2 at its other end. In the case of the next (in the circumferential direction) axial cooling channel through the laminated stator core 43, the tube 82 extends through the right-hand end winding area and the right-hand mounting plate 2. The coolant thus flows to the right in the cooling channel (not illustrated in the upper half of FIG. 2 but illustrated in the lower half) and to the outside via the tube 82. In the cooling channel 431 (sectioned in FIG. 2), which lies upstream thereof in the circumferential direction, on the other hand, the coolant flows to the left and to the outside through the tube 81.

A similar picture results as regards cooling the laminated rotor core. The integral laminated rotor core 63 has an axial cooling channel 631. The laminated rotor core 63 is held together by rotor clamping rings 91, 92. A flow channel 911 is incorporated into the left-hand rotor clamping ring 91. The flow channel 911 opens out into a cutout 21 in the mounting plate 2. This results in a flow of coolant which passes from the outside, through the cutout 32, into the housing of the asynchronous machine, through the right-hand end winding area, past the end windings and the short-circuiting ring into the cooling channel 631, through the flow channel 911 as the cooling channel protrusion and finally through the cutout 21 in the mounting plate to the outside. In the next (in the circumferential direction) cooling channel of the laminated rotor core 63, the flow is in the opposite direction. For this purpose, a corresponding flow channel (not illustrated) is provided in the rotor clamping ring 92 and guides the coolant out of the cutout 22 in the right-hand mounting plate.

A seal (not illustrated), for example a labyrinth seal, is arranged between the rotor clamping ring 91, 92 and the mounting plate 2 in order to prevent some of the cooling air from passing directly to the outside again.

The axially extending cooling channels both in the embodiment shown in FIG. 1 and in that shown in FIG. 2 can be arranged radially and in the circumferential direction in any desired manner in the laminated rotor and stator core. For reasons of simplicity, the drawings only illustrate cooling channels in the laminated stator and rotor core on in each case one circumferential surface with a constant radius. Furthermore, the flow direction of the cooling channels, in particular in the embodiment in FIG. 2, may be selected in any desired manner. It is merely necessary to take care that the distribution of cooling channels with different flow directions is approximately equally distributed in the circumferential direction. This thus prevents nonuniform cooling of the laminated cores and the windings.

An electrical machine according to the invention can be used in particular in environments where the cooling air contains a relatively high dirt content.

Heat exchangers cannot be used in traction machines owing to the narrow spatial conditions. These heat exchangers increase the temperature of the internal cooling air, which reduces the performance of the traction machine.

Without heat exchangers, a fine-pored air filter is required in the case of small slots between the laminated core elements.

If there is a high content of dirt in the cooling air, the filter mat will need to be changed very often.

An electrical machine according to the invention is therefore also particularly suited for driving dumper trucks in mining.

What is claimed is:

1. An electrical machine, comprising:
    a housing;
    a laminated stator core arranged in the housing and terminating in an end winding area; and
    a laminated rotor core arranged in the housing and terminating in an end winding area,
    wherein at least one member selected from the group consisting of the laminated stator core and the laminated rotor core has an axial cooling channel,
    wherein at least one of the end winding areas accommodates an open-ended cooling channel protrusion fluidly extending the cooling channel of the member in axial prolongation for allowing a discharge of coolant in axial direction from the housing to the outside.

2. The electrical machine of claim 1, wherein the housing includes a mounting plate, said member being the laminated stator core, with the cooling channel protrusion configured as a tube guided through the mounting plate.

3. The electrical machine of claim 1, wherein the member is the laminated rotor core, and further comprising a rotor clamping ring assembly for maintaining integrity of the laminated rotor core, wherein the cooling channel protrusion is part of the rotor clamping ring assembly.

4. The electrical machine of claim 3, wherein the housing includes a mounting plate, said rotor clamping ring assembly constructed to have a flow channel for guiding the coolant through the mounting plate, and further comprising a seal arranged between the rotor clamping ring assembly and the mounting plate.

5. The electrical machine of claim 1, wherein the member has a plurality of said cooling channel in circumferential spaced-apart relationship, and further comprising a plurality of said cooling channel protrusion communicating with the plurality of cooling channels in one-to-one correspondence, wherein every other one of the cooling channels is connected to cooling channel protrusions on one end of the member, and the other one of the cooling channels is connected to cooling channel protrusions on an opposite end of the member.

6. A method for cooling an electrical machine, comprising the steps of:
    passing a coolant through at least one axial cooling channel of a member selected from the group consisting of the laminated stator core and the laminated rotor core and disposed in a housing; and
    transferring the coolant from the least one cooling channel through an open-ended cooling channel protrusion fluidly extending the cooling channel of the member in axial prolongation in an end winding area of the member for discharge of coolant in axial direction from the housing to the outside.

7. The method of claim 6, wherein the coolant flows through a plurality of said axial cooling channel of the member in circumferential spaced-apart relationship such that coolant flows through the cooling channels alternately in opposite directions.

* * * * *